United States Patent
Mathews et al.

(10) Patent No.: US 9,723,345 B2
(45) Date of Patent: *Aug. 1, 2017

(54) GRAPHICS HANDLING FOR ELECTRONIC PROGRAM GUIDE GRAPHICS IN AN RVU SYSTEM

(71) Applicant: Verizon Patent and Licensing Inc., Arlington, VA (US)

(72) Inventors: Robin Montague Mathews, Westford, MA (US); Tushar Saxena, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/572,948

(22) Filed: Dec. 17, 2014

(65) Prior Publication Data

US 2015/0106853 A1 Apr. 16, 2015

Related U.S. Application Data

(63) Continuation of application No. 12/965,183, filed on Dec. 10, 2010, now Pat. No. 8,925,009.

(51) Int. Cl.
| | |
|---|---|
| *H04N 21/262* | (2011.01) |
| *H04N 21/235* | (2011.01) |
| *H04N 21/482* | (2011.01) |
| *H04N 21/237* | (2011.01) |
| *H04N 21/2383* | (2011.01) |

(52) U.S. Cl.
CPC ..... *H04N 21/26283* (2013.01); *H04N 21/237* (2013.01); *H04N 21/2353* (2013.01); *H04N 21/2355* (2013.01); *H04N 21/2383* (2013.01); *H04N 21/482* (2013.01)

(58) Field of Classification Search
CPC ............. H04N 21/2355; H04N 21/482; H04N 21/26283; H04N 21/237; H04N 21/2383; H04N 21/2353
See application file for complete search history.

(56) References Cited

U.S. PATENT DOCUMENTS

| | | |
|---|---|---|
| 2005/0086608 A1 | 4/2005 | Roessler |
| 2006/0168526 A1 | 7/2006 | Stirbu |
| 2006/0174026 A1 | 8/2006 | Robinson et al. |
| 2007/0097138 A1 | 5/2007 | Sorotokin et al. |

(Continued)

*Primary Examiner* — Benjamin R Bruckart
*Assistant Examiner* — Tien M Nguyen

(57) ABSTRACT

A network device includes an electronic program guide (EPG) component configured to receive EPG data associated with an EPG from an external EPG server. The network device further includes a manager component comprising a pre-loader configured to pre-render and send first EPG images, associated with the EPG, that are frequently re-used to multiple client devices; a graphics interceptor configured to generate one or more second EPG images based on a graphics call, wherein the graphics call causes a first one of multiple client devices to display the one or more second EPG images; and a window manager configured to track changes in the one or more second EPG images and send a modified EPG image that includes the changes, or a modified portion of an EPG image that includes the changes, to the first one of the multiple client devices.

20 Claims, 14 Drawing Sheets

(56) References Cited

U.S. PATENT DOCUMENTS

| | | |
|---|---|---|
| 2008/0222332 A1 | 9/2008 | Lee et al. |
| 2009/0132578 A1 | 5/2009 | Parikh et al. |
| 2009/0260038 A1 | 10/2009 | Acton et al. |
| 2009/0265648 A1* | 10/2009 | Ryu .................. G06F 9/4445 715/764 |
| 2011/0035772 A1* | 2/2011 | Ramsdell ............ H04H 20/103 725/36 |
| 2011/0107379 A1* | 5/2011 | Lajoie ................ H04L 65/4076 725/87 |
| 2011/0292171 A1 | 12/2011 | Palm et al. |

\* cited by examiner

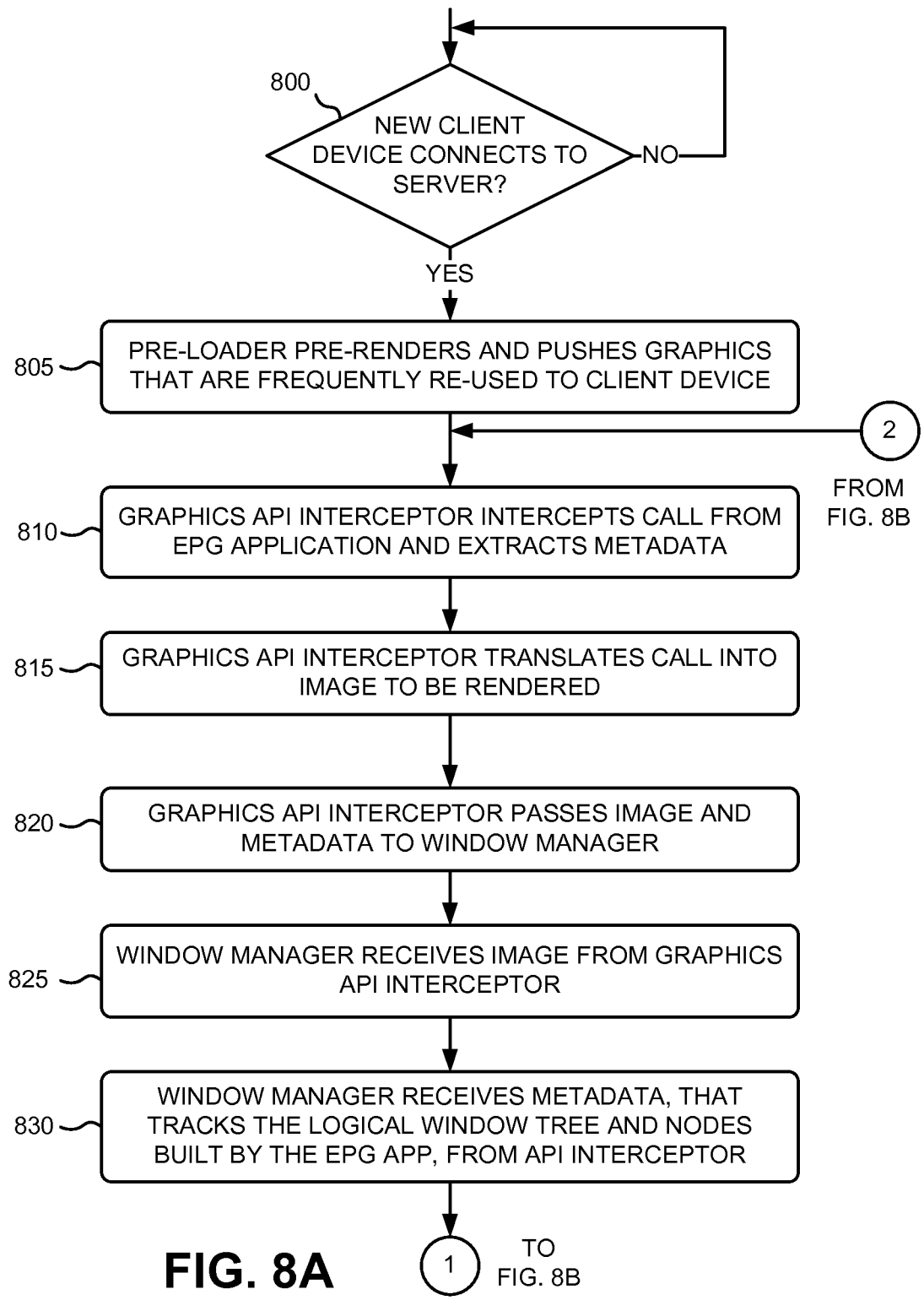

GRAPHICS HANDLING FOR ELECTRONIC PROGRAM GUIDE GRAPHICS IN AN RVU SYSTEM

RELATED APPLICATION

The present application is a continuation of U.S. application Ser. No. 12/965,183, entitled "Graphics Handling for Electronic Program Guide Graphics in an RVU System" and filed Dec. 10, 2010, the disclosure of which is incorporated by reference herein in its entirety.

BACKGROUND

Typically, home entertainment subscribers, such as, for example, subscribers to cable network home entertainment, connect multiple televisions to cable network connections throughout the home. A typical home entertainment system may include a single, primary television connected to a set-top box (STB) to receive high definition programming via the cable network, while other televisions in the home connect directly to the cable network and may only receive a limited number of high definition channels. Each of the televisions cannot necessarily access media being presented at the other televisions. For example, a television connected directly to the cable network cannot access high definition media that is available to the television connected to the STB. Additionally, the televisions connected directly to the cable network may not receive other types of media that may be accessed at the television connected to the STB. For example, if the STB includes a digital video recorder (DVR), the recorded television programming stored on the DVR is only accessible via the television connected to the STB, and not to the other televisions connected directly to the cable network.

The RVU (pronounced "R-view") protocol specification has been introduced in the home entertainment industry to enable television viewers to watch live or recorded television programming, or other types of media, on any television within the home, while at the same time experiencing a consistent user interface. With the RVU protocol specification, RVU-compliant televisions (i.e., RVU clients) are networked in the home with an RVU server. Once networked, viewers can watch the same or different content from any television in the home. For example, a viewer can access live high-definition programming from any of the televisions in the home, and can record and play back high-definition programming from any of the televisions. Additionally, the viewer can access personal media content, and interact with interactive applications from any of the televisions. The RVU protocol's system is based on a client-server architecture in which the server distributes and manages content and a consistent user interface to one or many client devices, such as televisions. The RVU clients can connect to programming that can be recorded or watched live, and can also access pictures, home movies, and/or other personal content from connected storage devices. All of the content may be accessed from anywhere inside the home, allowing multiple viewers in different rooms to view the same or different content from the RVU server simultaneously.

BRIEF DESCRIPTION OF THE DRAWINGS

FIGS. 8A and 8B are flow diagrams illustrating an exemplary process for efficiently transferring EPG images via the RVU manager of FIG. 6 to one or more client devices.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein handle the efficient transfer of graphics associated with a Electronic Program Guide (EPG) from an RVU server to one or more RVU client devices. An RVU manager logical component of the RVU server includes various logical subcomponents that translate EPG data received from an external EPG server to EPG images that can be displayed by the RVU client devices. The logical subcomponents transfer the EPG images to the RVU client devices in an efficient manner that reduces bandwidth usage between the RVU server and the RVU client devices.

Figure 1:
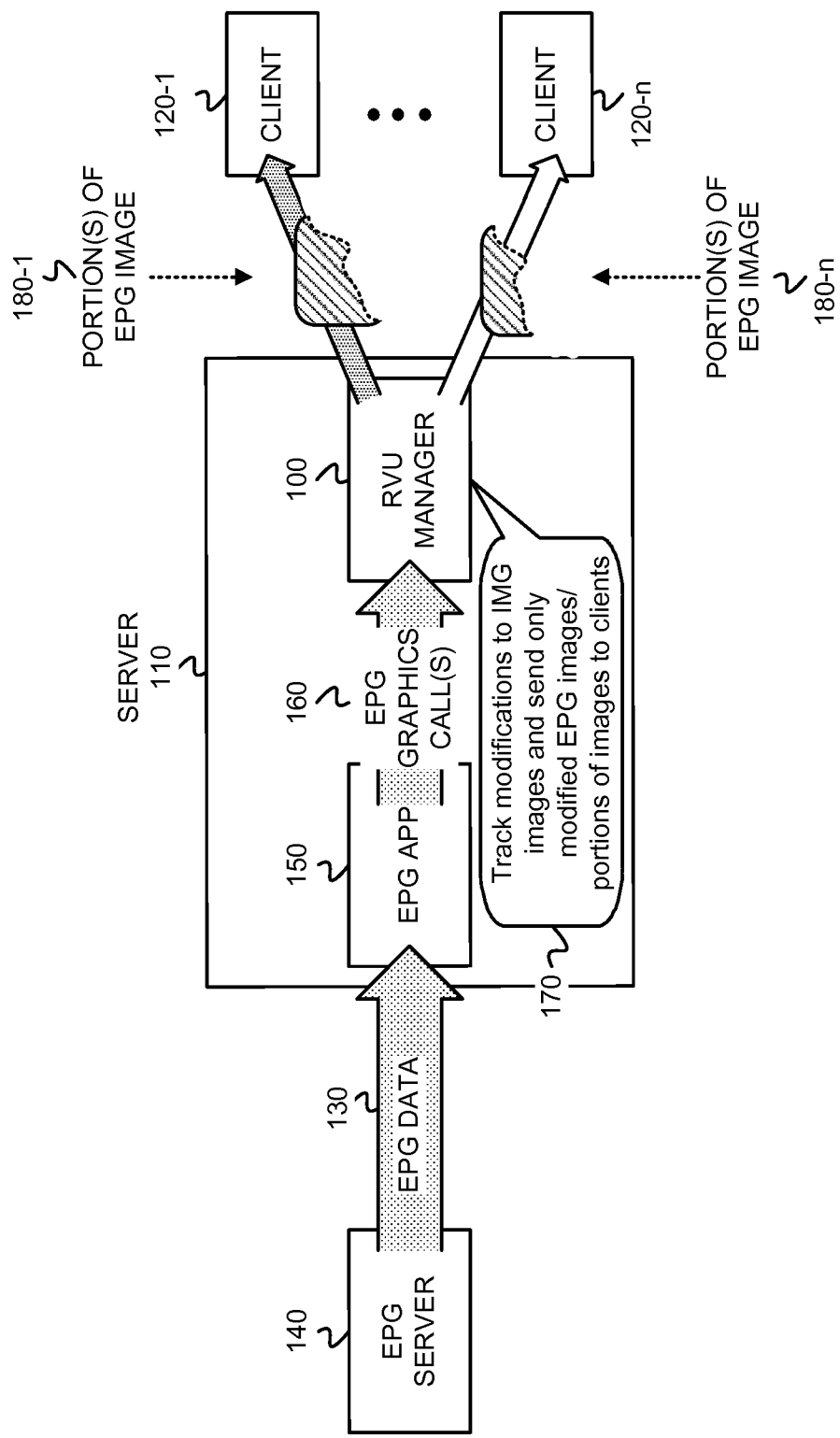
FIG. 1 is a diagram that depicts an overview of exemplary embodiments for transferring Electronic Program Guide (EPG) graphics, in an RVU environment in which a server receives EPG data from a remote EPG server and transfers EPG graphics to one or more client devices for display to respective users viewing the IMG.

FIG. 1 is a diagram that depicts an overview of exemplary embodiments for transferring EPG graphics in an RVU environment in which a server receives EPG data from a remote EPG server and transfers corresponding EPG graphics or images to one or more client devices for display to respective users viewing the EPG. The one or more client devices and the server may be located at single subscriber location (e.g., at a single residence or commercial building). An "electronic program guide (EPG)," as referred to herein, includes menus of program scheduling information that are shown by a cable or satellite TV provider to its viewers and that displays current and upcoming programming. An EPG permits viewers to navigate through scheduling information interactively, selecting and discovering programming by time, station, or title. EPGs enable the viewer to identify desired programming using interactive menus and, if Digital Video Recording (DVR) functionality is present in the viewer's system, may permit the viewer to schedule the recording of desired programming via the EPG.

As shown in the overview depicted in FIG. 1, an RVU manager 100, residing at a server 110, may send images, or portions of images, that are associated with the EPG for display at one or more client devices 120-1 through 120-n. Server 110 may receive EPG data 130 from a remote EPG server 140. EPG data 130 may include various data associated with the display of the Electronic Program Guide at clients 120-1 through 120-*n*, including data associated with EPG graphics. EPG application 150 may receive and process the received EPG data 130 from EPG server 140. EPG application 150 may subsequently send one or more EPG graphics calls 160 to RVU manager 120 for displaying one or more EPG images associated with the EPG at one or more of clients 120-1 through 120-*n*. RVU manager 100 may track 170 modifications to EPG images and send only modified EPG images, or portions of EPG images, to clients 120-1 through 120-*n*. Those EPG images previously sent to client devices 120-1 through 120-*n*, which have not been modified by subsequent graphics handling operations, may not be re-sent to the client devices, thus, reducing bandwidth usage between server 110 and client devices 120. For example, as shown in FIG. 1, RVU manager 100 may, based on one of EPG graphics calls 160, send a modified portion 180-1 of an EPG image to client 120-1. Additionally, RVU manager 100 may, based on another one of EPG graphics calls 160, send a modified portion 180-*n* of another EPG image to client 120-*n*. By only sending a modified portion(s) of an EPG image, or sending only a modified image among a set of multiple images, RVU manager 100 of server 110 efficiently transfers EPG images to clients 120-1 through 120-*n* using a minimum amount of bandwidth.

Figure 2:
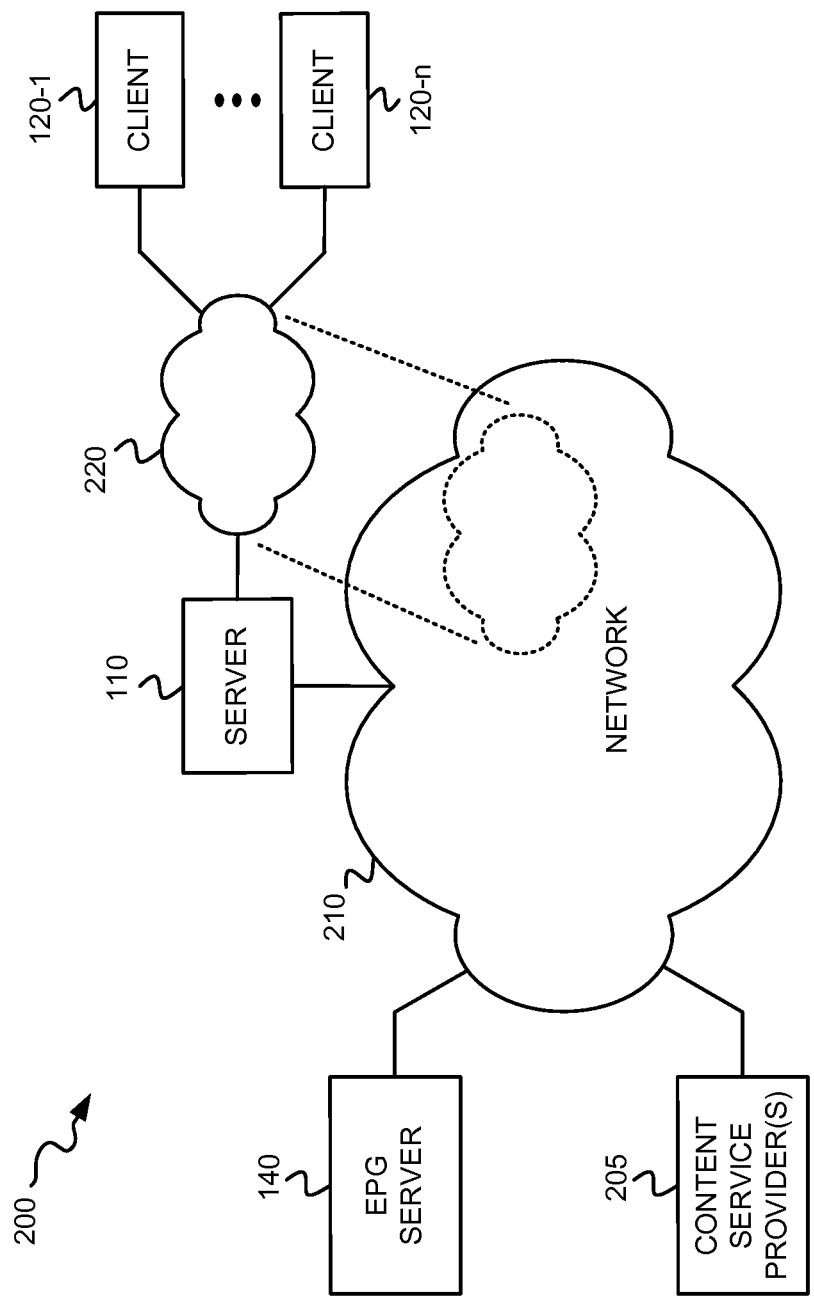
FIG. 2 is a diagram that depicts an exemplary network environment in which content and IMG data may be delivered to end user client devices via the network.

FIG. 2 is a diagram that depicts an exemplary network environment 200 in which content (e.g., media) and EPG data may be delivered to end user client devices via the network. Network environment 200 may include a content service provider(s) 205, a network 210, EPG server 140, server 110, a network 220, and clients 120-1 through 120-*n* (generically and individually referred to herein as a "client 120").

Content service provider(s) 205 may include one or more devices, or a network of devices, that deliver content to clients 120-1 through 120-*n*. Content service provider(s) 205 may deliver the content to clients 120-1 through 120-*n* via one or more channels (e.g., Quadrature Amplitude Module (QAM) channels) over network 210 via server 110. The content may include, for example video programs.

Network 210 may include one or more networks of any type, such as, for example, a cable network, a satellite network, a telecommunications network (e.g., a Public Switched Telephone Network (PSTN) or Public Land Mobile Network (PLMN)), or an Advanced Television Systems Committee (ATSC) standards network. Network 210 may include one or more QAM channels (or other types of modulated or broadcast channels) for delivering media and EPG data to server 110.

Server 110 may include a RVU server that may receive media delivered from content service provider(s) 205 via network 210, and forward the received media to a respective client device 120 via IP. Server 110 may also tune to a channel on network 210 to receive EPG data from EPG server 140, and then send EPG images to appropriate ones of clients 120-1 through 120-*n*.

Network 220 may, in one implementation, include a separate network from network 210, where the separate network may include, for example, a local area network, wide area network, Internet, or other type of packet-based network (e.g., IP). In another implementation, network 220 may be included within network 210. When network 210 is included within network 110, then server 110 may use different channels (e.g., a different QAM channel) to deliver media and EPG images to clients 120-1 through 120-N than the QAM channels used to deliver media from content service provider(s) 205 to server 110, and to deliver EPG data from EPG server 140 to server 110.

Clients 120-1 through 120-*n* may include client devices that may include mechanisms for receiving media and EPG images forwarded from server 110 via IP using the RVU protocol. Clients 120-1 through 120-*n* may also each include, and/or connect to, a display device that may display the EPG images and content (e.g., media) received from server 110.

The configuration of network components of network environment 200 illustrated in FIG. 2 is for illustrative purposes only. Other configurations may be implemented. Therefore, network environment 200 may include additional, fewer and/or different components than those depicted in FIG. 2.

Figure 3:
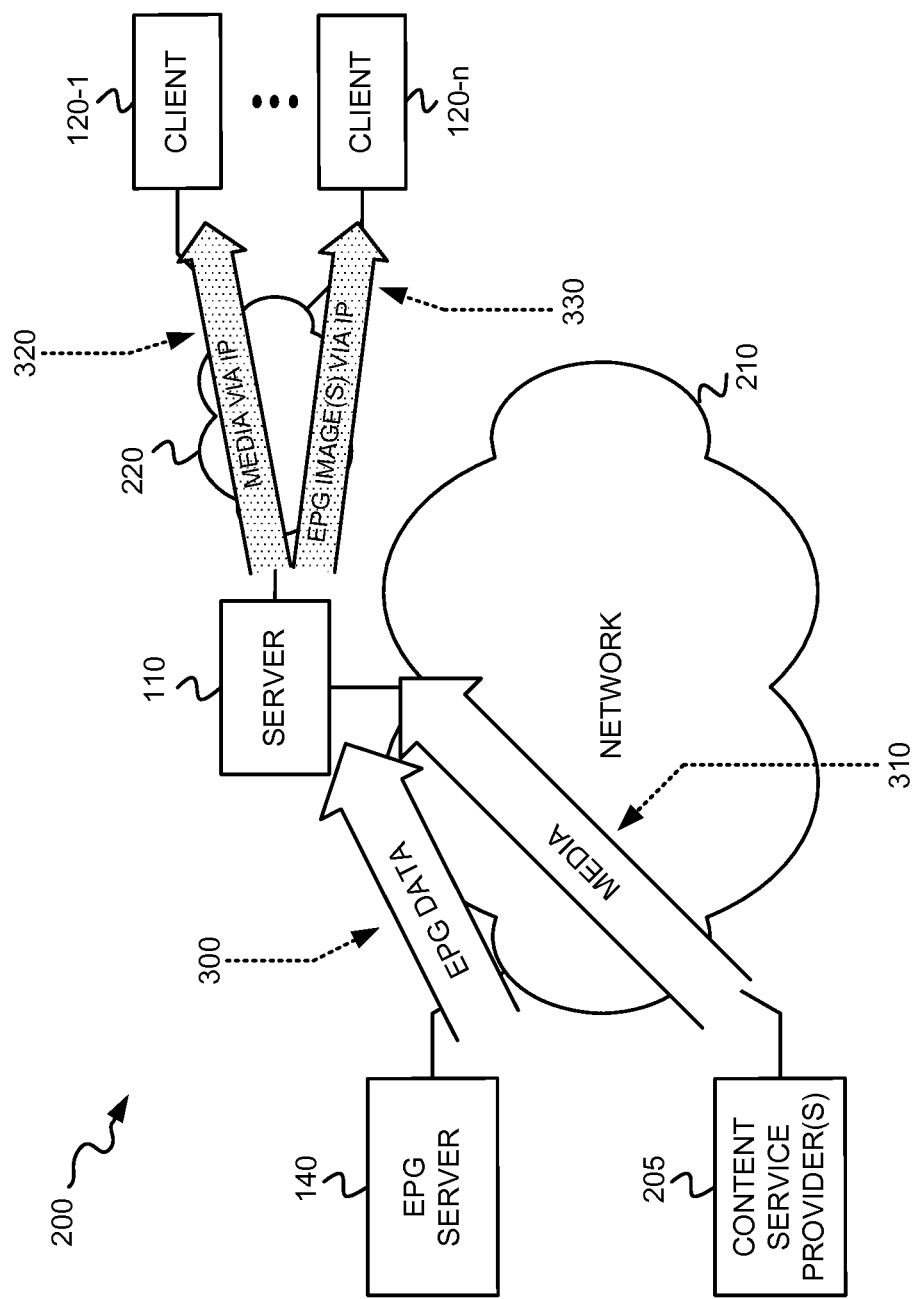
FIG. 3 is a diagram that depicts the delivery of content and EPG data to end user client devices within the network environment of FIG. 2.

FIG. 3 is a diagram that depicts the delivery of content and EPG data to end user client devices within the network environment 200 of FIG. 2. As shown in FIG. 3, EPG server 140 may deliver EPG data 300, that includes various data related to the display of an electronic program guide at clients 120-1 through 120-*n*, to server 110 via network 210. Upon receipt of EPG data 300, server 110 may send one or more EPG images via IP to an appropriate one of clients 120-1 through 120-*n*. As further shown in FIG. 3, content service provider(s) 205 may deliver media 310 via network 210 to server 110. Upon receipt of the delivered media 310, server 110 may send the media via IP to an appropriate one of clients 120-1 through 120-*n*.

Figure 4:
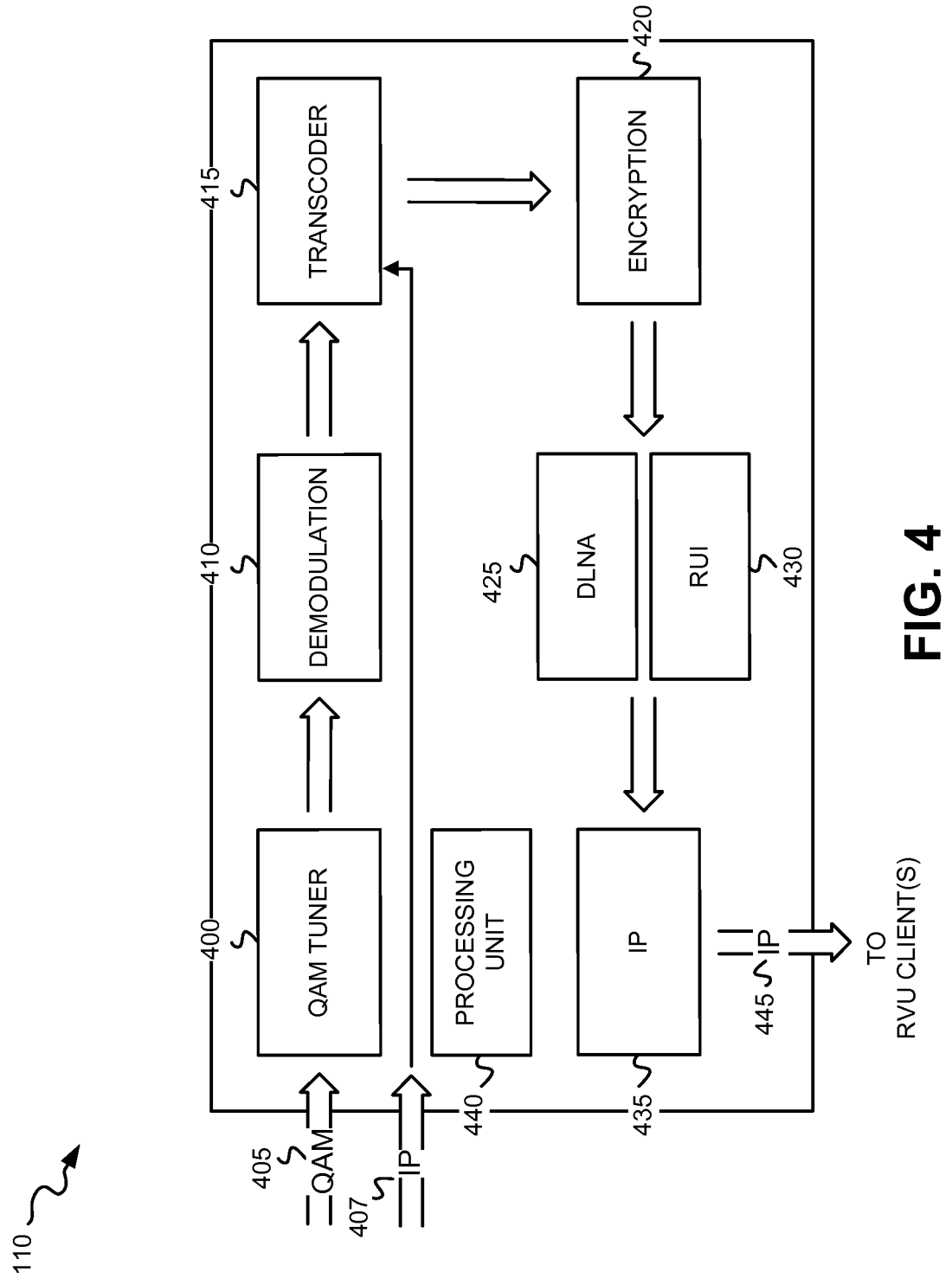
FIG. 4 is a diagram of exemplary components of the server of FIG. 2.

FIG. 4 is a diagram of exemplary components of server 110. Server 110 may include a QAM tuner subsystem 400, a demodulation subsystem 410, a transcoder subsystem 415, an encryption subsystem 420, a DLNA subsystem 425, a RUI subsystem 430, an IP subsystem 435, and a processing unit 440.

QAM tuner subsystem 400 may include mechanisms for tuning to one or more QAM channels on network 210 for receiving the delivery of media from content service provider(s) 205 and for receiving the delivery of EPG data from EPG server 140. Demodulation subsystem 410 may include mechanisms for demodulating signals received via the QAM channels on network 210. Transcoder subsystem 415 may include mechanisms for digital-to-digital conversion of data encoded for transmission over the QAM channels to data encoded for transmission via IP to client devices 120. Transcoder subsystem 415 may, as shown in FIG. 4, additionally receive the delivery of media and EPG data via an IP channel 407 over network 210, instead of via QAM channel(s) 405, thereby bypassing QAM tuner subsystem 400 and demodulation subsystem 410. Encryption subsystem 420 may include mechanisms for encrypting the data received from transcoder subsystem 415. DLNA subsystem 425 may include mechanisms for implementing the Digital Living Network Alliance (DLNA) standard for delivering content (e.g., media) and EPG images from server 110 to clients 120-1 through 120-*n*. RUI subsystem 430 may include mechanisms for implementing a Remote User Interface (RUI) for facilitating the delivery of media and EPG images to clients 120. IP subsystem 435 may include mechanisms for delivery of media and EPG images to clients 120-1 through 120-*n* using IP. Processing unit 440 may include one or more processors, microprocessors, or processing logic that may interpret and execute instructions. Processing unit 440 may interface with each of the subsystems of server 110 described above. Server 110 may additionally include memory (not shown).

The configuration of components of server 110 illustrated in FIG. 4 is for illustrative purposes only. Other configurations may be implemented. Therefore, server 110 may include additional, fewer and/or different components than those depicted in FIG. 4.

Figure 5:
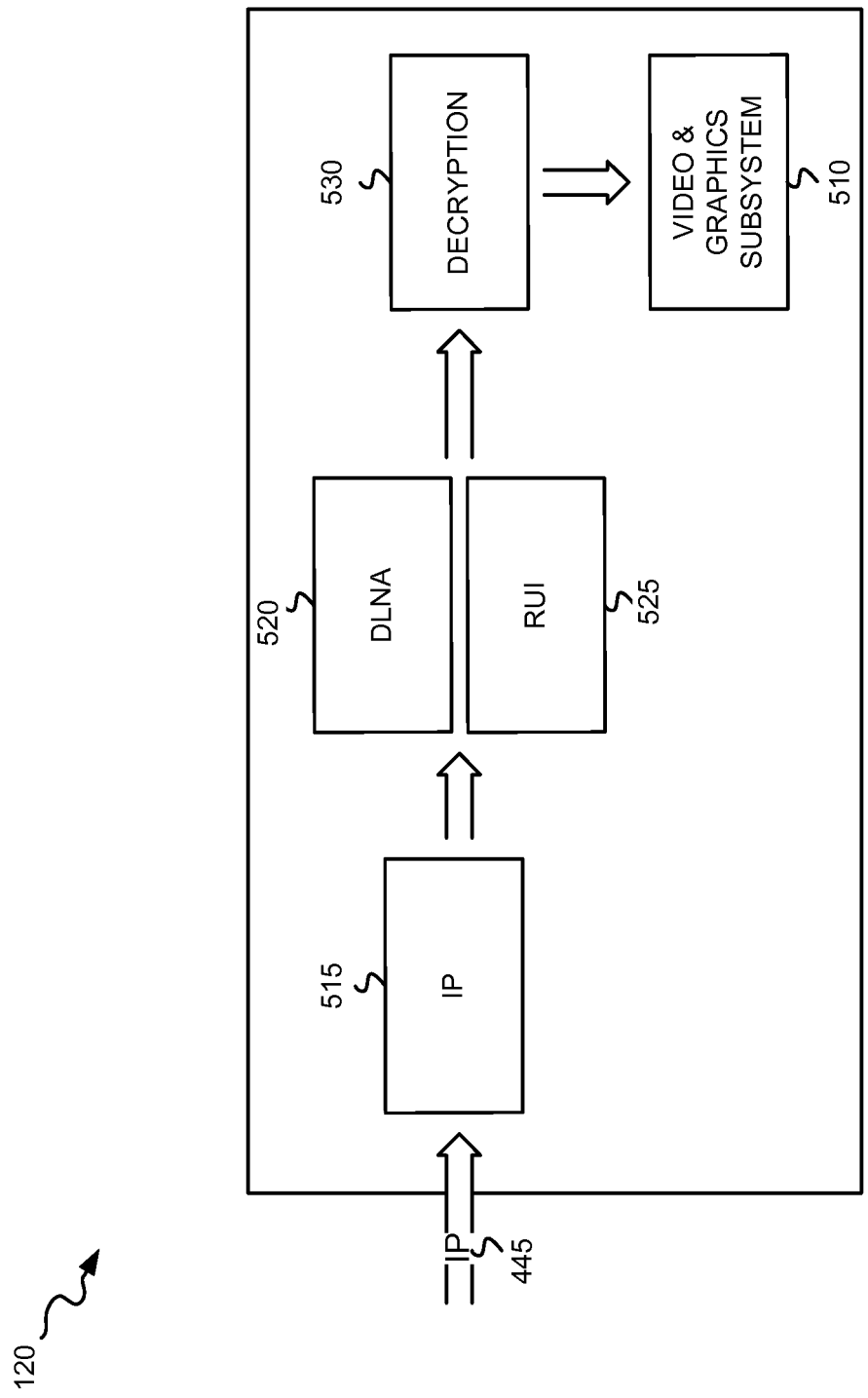
FIG. 5 is a diagram of exemplary components of a client of FIG. 2.

FIG. 5 is a diagram of exemplary components of a client 120, where client 120 includes mechanisms for receiving content and EPG images via IP from server 110. Client 120 may include a video & graphics subsystem 510, an IP subsystem 515, a DLNA subsystem 520, a RUI subsystem 525, and a decryption subsystem 530.

Video & graphics subsystem 510 may include mechanisms for generating signals required to display media and EPG images on a video unit (e.g., a video monitor, or television screen). IP subsystem 515 may include mechanisms for receiving data associated with delivered media and EPG images via IP from server 110. DLNA subsystem 520 may include mechanisms for implementing the DLNA standard for receiving content (e.g., media) and EPG images delivered from server 110. RUI subsystem 525 may include mechanisms for implementing a RUI for facilitating the delivery of media and EPG images to client 120. Decryption subsystem 530 may include mechanisms for decrypting media data and EPG images and for supplying the decrypted media data and EPG images to video subsystem 510 for displaying to a user. Client 120 may additionally include memory (not shown).

The configuration of components of client device 120 illustrated in FIG. 5 is for illustrative purposes only. Other configurations may be implemented. Therefore, client device 120 may include additional, fewer and/or different components than those depicted in FIG. 5.

Figure 6:
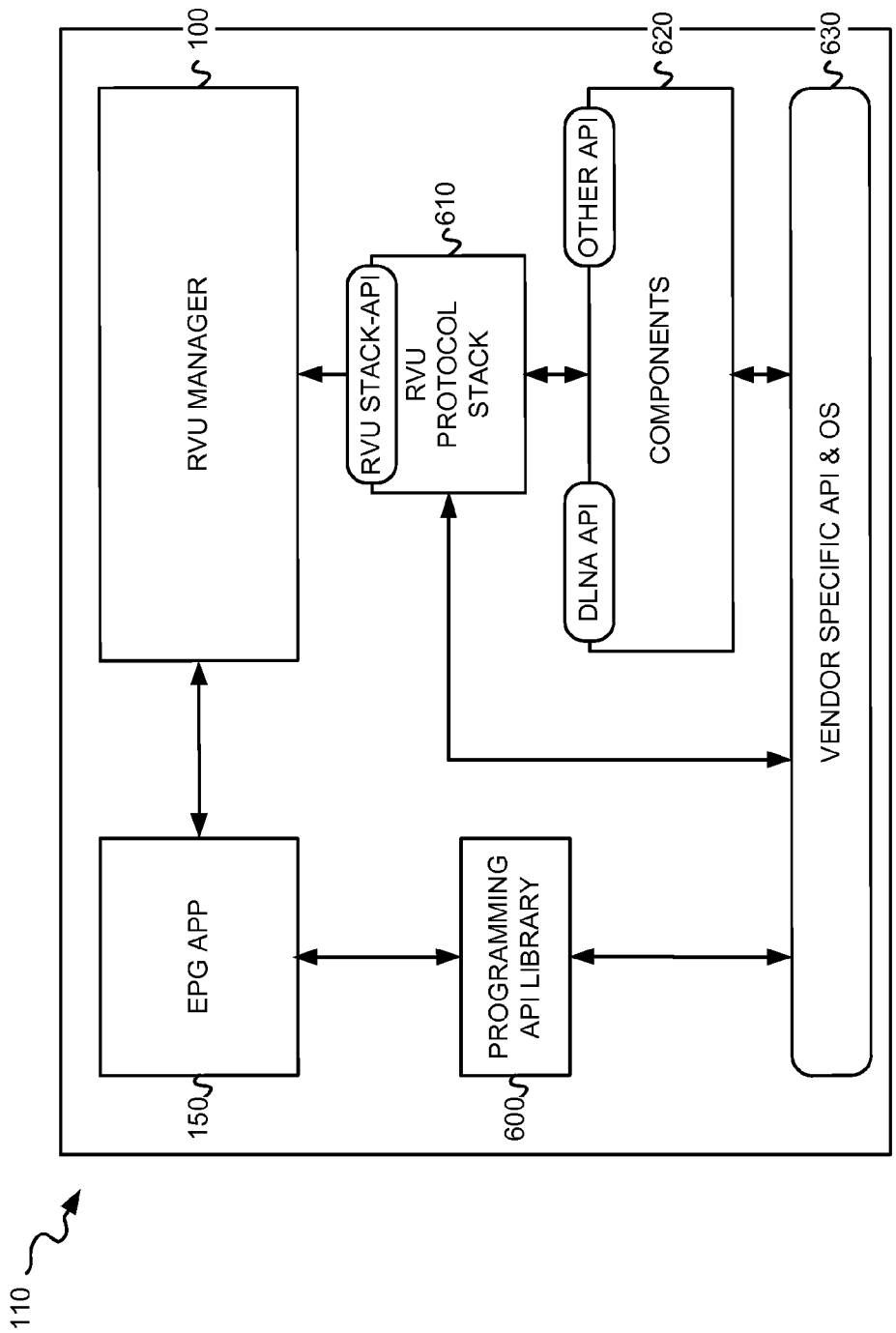
FIG. 6 illustrates exemplary logical components of the server of FIG. 2.

FIG. 6 illustrates exemplary logical components of server 110. The logical components of server 110, shown in FIG. 6, may be implemented by processing unit 440. The logical components of server 110 may include a programming API library 600, EPG application 150, RVU manager 100, an RVU protocol stack 610, other logical components 620, and an API and OS 630.

Programming API library 600 may enable RVU manager 100 and EPG application 150 to access system functions (e.g., memory allocation, kernel functions, etc.). EPG application 150 may receive EPG data from EPG server 140 and may generate a logical window tree for each EPG image that is to be displayed at a client 120. Each logical window represents a node in the logical window tree, and is associated with a block of memory that stores image data (e.g., in ARGB8 or ARGB32 format). EPG application 150 may, based on the EPG data received from EPG server 140, modify the structure of each logical window tree, and modify the logical windows in the logical window tree. EPG application 150 may additionally perform graphic primitive operations on the logical windows to generate a single "display canvas" (i.e., a composite image) composed of the logical windows of the tree. The image data store in the blocks of memory associated with each logical window of the tree may be used to represent pixel information on a single "display canvas" that is to be displayed at a client device 120.

RVU manager 100 may be functionally positioned between EPG application 150 and RVU protocol stack 610 such that RVU manager 100 interfaces with EPG application 150 via one interface and interfaces with RVU protocol stack 610 via another interface. RVU protocol stack 610 may implement the RVU protocol specification and may provide the functionality to frame RVU compliant packets and send them over network 220. RVU manager 100 may use the RVU stack API to interface with RVU protocol stack 610. Details of the functions performed by RVU manager 100, and its logical subcomponents, are described further below with respect to FIG. 7.

Other logical components 620 may include various components associated with graphics handling and graphics transferring to client devices 120-1 through 120-*n*. Such components may include, but are not limited to, a DLNA engine, an XML parser, etc. API and OS 630 may include a vendor specific API and the Operating System (OS) for interfacing with Programming API library 600, other components 620, and RVU protocol stack 610.

The configuration of logical components of server 110 illustrated in FIG. 6 is for illustrative purposes only. Other configurations may be implemented. Therefore, server 110 may include additional, fewer and/or different logical components than those depicted in FIG. 6.

Figure 7:
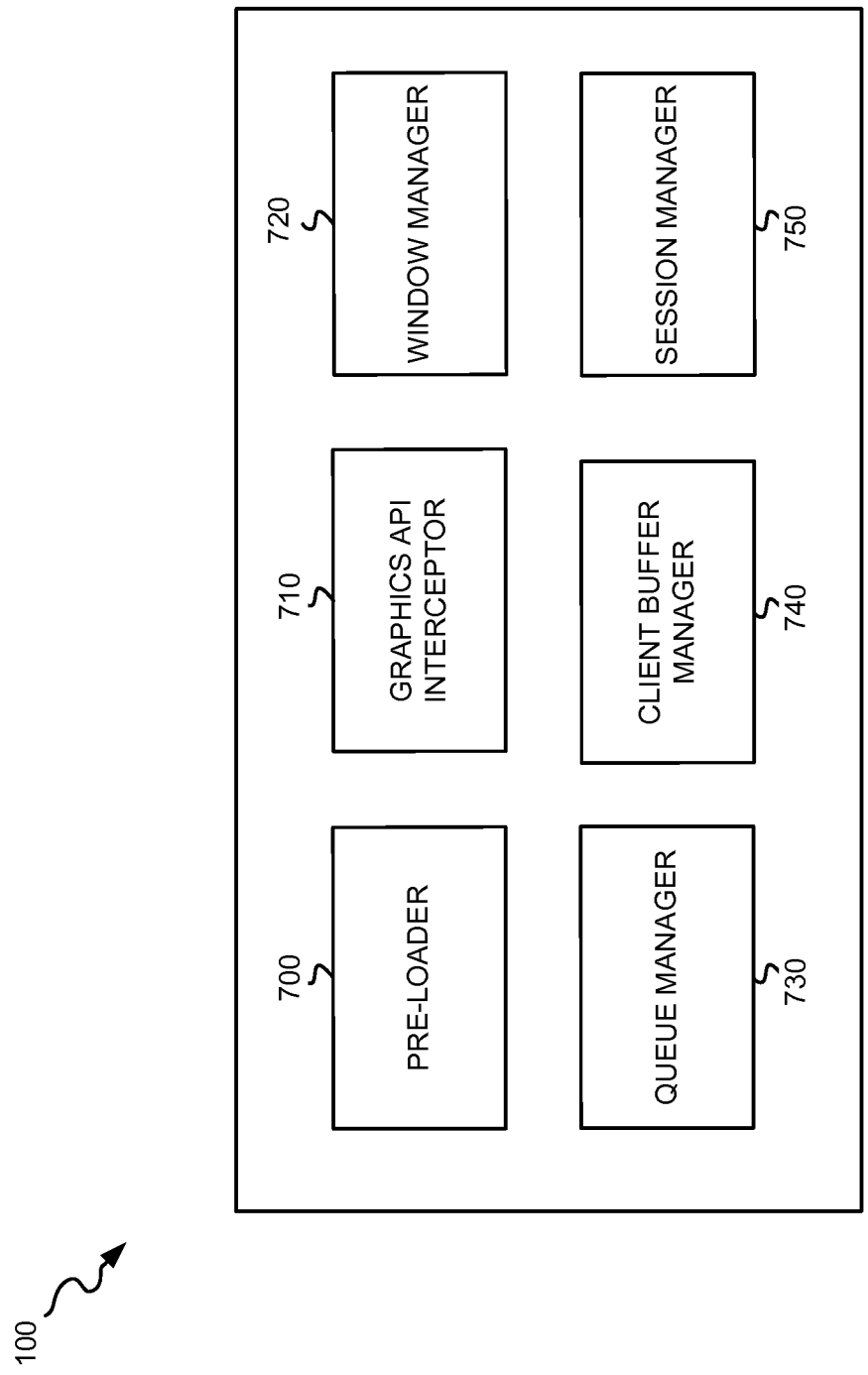
FIG. 7 illustrates exemplary logical subcomponents of the RVU manager of FIG. 6.

FIG. 7 illustrates exemplary logical subcomponents of RVU manager 100 of FIG. 6. RVU manager 100 may include a pre-loader 700, a graphics API interceptor 710, a window manager 720, a queue manager 730, a client buffer manager 740, and a session manager 750.

Pre-loader 700 may pre-render and store static images that can be re-used between client devices 120 as well as images that may be used often by any given client device 120. Whenever a new client device 120 connects to server 110, pre-loader 700 may transmit or push pre-rendered images to the new client device 120 in the background (e.g., using unused bandwidth). These pre-rendered images are, therefore, readily available to the client device when server 110 decides to perform certain rendering of EPG graphics. Pre-loader 700 may continuously add or flush pre-rendered images pushed out to one or more of the client devices.

Graphics API interceptor 710 may intercept graphics calls associated with EPG data received from EPG application 150 and translate those calls into EPG images for display by client devices 120. Graphics API interceptor 710 may additionally extract metadata passed by EPG application 150 in relation to displaying EPG images and data at client devices 120.

Window manager 720 may receive EPG images from graphics API interceptor 710 and metadata. Window manager 720, using the metadata received from graphics API interceptor 710, may create a logical window tree in which each node of the tree represents a logical window that can be rendered. Window manager 720 may, based on the metadata, track each node of the tree and the logical windows of the tree may be combined to form a final image that may be sent to a client device for display. Window manager 720 may, based on the metadata, track which nodes in the logical tree have been modified (i.e., "dirtied") by graphics operations. Window manager 720 may then use this tracking information to transfer only modified images, or parts of modified images, to the target client device. Window manager 720 may also include functionality for efficiently translating generated images to equivalent paint commands that may be transmitted via the RUI command to each client device.

Queue manager 730 may perform two tasks within RVU manager 100. A first task may include ensuring that a client device has received an image sent to it when queue manager 730 interfaces with RVU protocol stack 610. To perform this task, queue manager 730 maintains an active window queue of "send images" that it uses for re-sending images when queue manager 730 determines that images were not received at a respective client device. When a client device has received an image successfully, queue manager 730 removes the image from its active window queue. To determine whether a client device has received an image successfully, queue manager 730 tracks acknowledgments (ACKs) or Negative Acknowledgments (NAKs) received from the client device 120. When a client device 120 returns a NAK (i.e., indicating that a particular image was lost or failed to be received), queue manager 730 retrieves the images from the active window queue and re-sends the image to the client device 120. A second task performed by queue manager 730 may include the control of outbound data packets that are being sent to each client device 120. Queue manager 730 has knowledge of the bandwidth limitations of network 220 (i.e., network environment in which data is sent from server 110 to clients 120-1 through 120-n) and ensures that connected clients 120-1 through 120-n receive service from server 110 without causing service "starvation" to any one client device 120.

Client buffer manager 740 may include a memory managing unit that tracks the images available for display and also keeps track of the available memory buffers that are located physically on each client device 120 where the images are stored for display. Client buffer manager 740 may perform buffer management on behalf of each connected client device 120. Client buffer manager 740 may track buffer allocations, de-allocations, and the flushing of specific buffers on specific client devices 120.

Session manager 750 may manage multiple client devices 120 that connect to server 110. Session manager 750 may track of each connected client device 120 and may uniquely identify each client device 120 such that, after a client device 120 disconnects and re-connects, the client device's information may be "remembered" and provided to other components, such as, for example, EPG application 150. Session manager 750 may, for example, track each client device's "tuned to" channel, Graphical User Interface (GUI) state, running configuration, and client device state.

The configuration of logical subcomponents of RVU manager 100 illustrated in FIG. 7 is for illustrative purposes only. Other configurations may be implemented. Therefore, RVU manager 100 may include additional, fewer and/or different logical subcomponents than those depicted in FIG. 7.

Figure 8B:
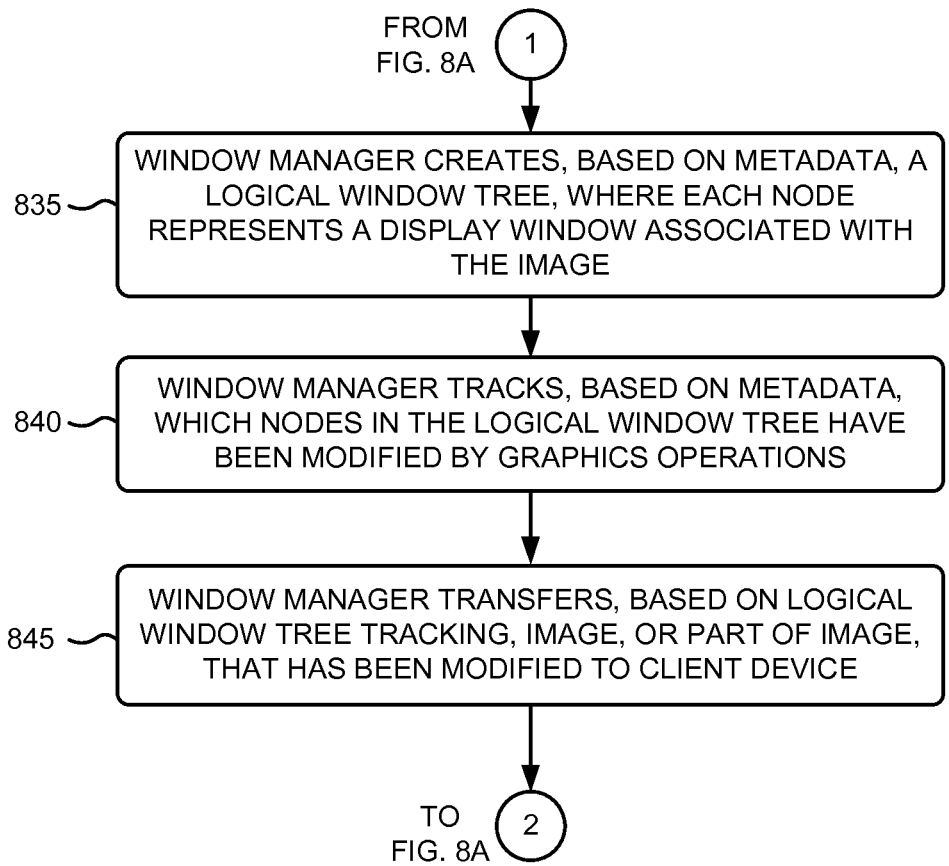

FIGS. 8A and 8B are flow diagrams illustrating an exemplary process for efficiently transferring EPG images via RVU manager 100 of server 110 to one or more of client devices 120-1 through 120-n. The exemplary process of FIGS. 8A & 8B may be implemented by RVU manager 100 of server 110, as described further below. The blocks of the exemplary process of FIGS. 8A and 8B may be implemented to send a first set of EPG images from RVU server 110 to a client device 120, with subsequent graphics calls involving new replacement images or modifications to the previously transferred EPG images.

The exemplary process may include determining if a new client device 120 has connected to server 110 (block 800). One of client devices 120-1 through 120-n, shown in FIG. 2, may include a client device that is newly connected to server 110 via network 220. Server 110 may discover the client device upon its connection to network 220.

Figure 9:
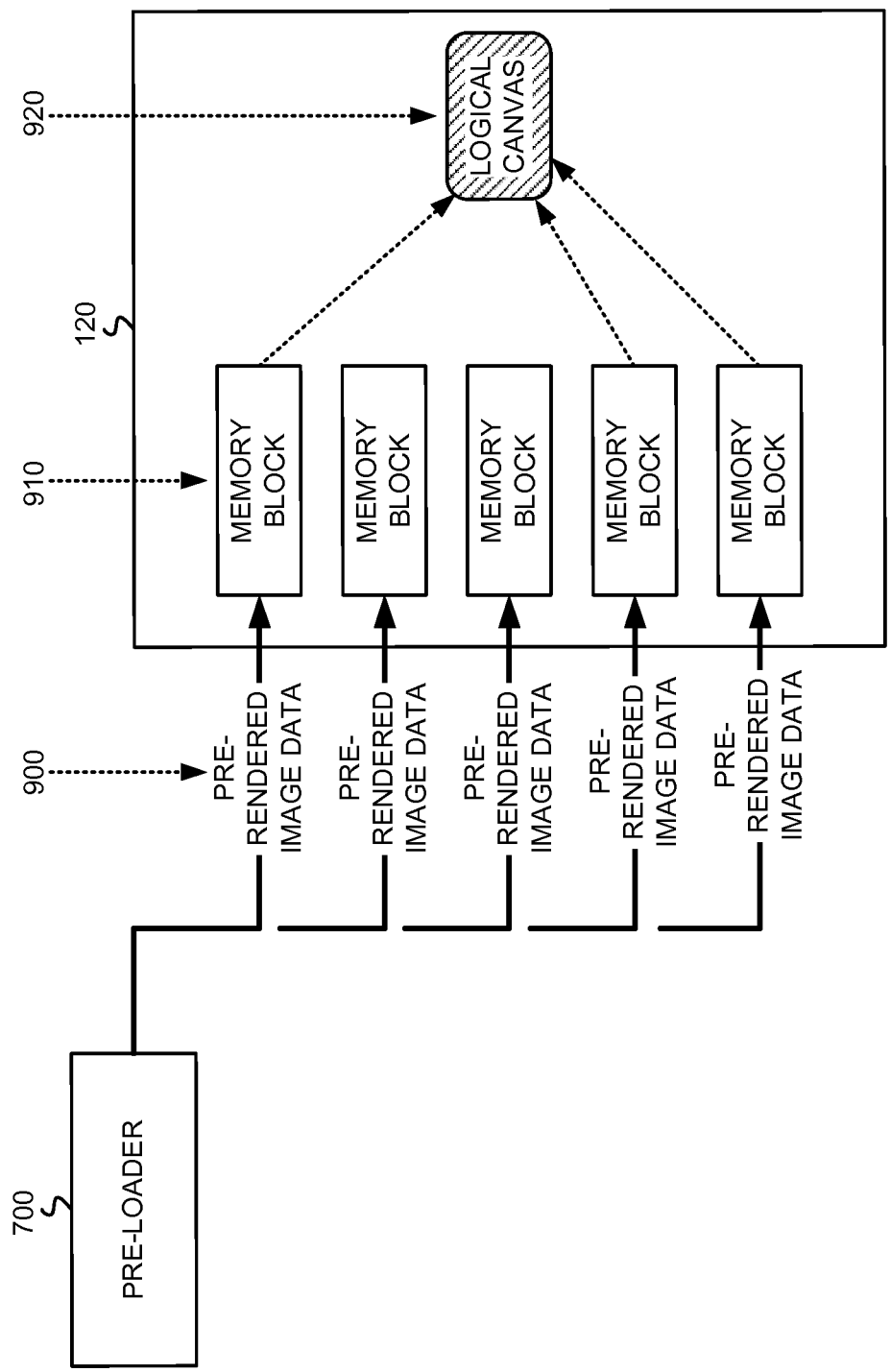
FIGS. 9-13 depict examples of graphics handling associated with various blocks of the exemplary process of FIGS. 8A and 8B.

If a new client device 120 has connected to server 110 (YES—block 800), then pre-loader 700 may pre-render and push graphics that are frequently re-used to newly connected client device 120 (block 805). Pre-loader 700 may store images that are re-used between client devices and that may often be used by any given client device (e.g., broadcast network icons, program logos, etc.). Pre-loader 700 may transmit or push the pre-rendered graphics to client device 120 in the background using unused bandwidth. FIG. 9 depicts an example of pre-loader 700 pushing pre-rendered image data 900 to client device 120. As shown in FIG. 9, each pre-rendered image may be pushed from pre-loader 700 to be stored in a block 910 of memory at client device 120. The image data stored in each memory block 910 may include image data in ARGB8 or ARGB32 format. Client device 120 may use one or more images stored in respective memory blocks 910 to generate a single logical canvas 920 for display on a display device associated with client device 120. Logical canvas 920 may, therefore, represent one or more images "overlaid" on top of one another to create logical canvas 920 that includes a composite of the one or more images.

Figure 10:
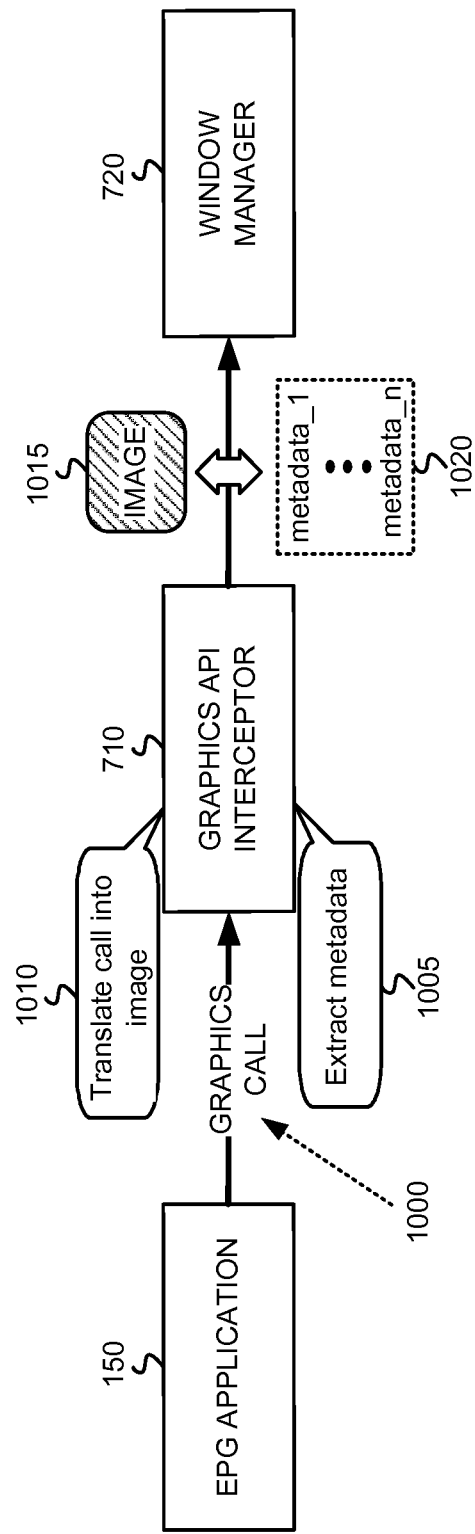

Graphics API interceptor 710 may intercept a call from EPG application 150, and may extract metadata (block 810). EPG application 150, based on EPG data 130 received from EPG server 140, may initiate a call intended to cause the display of EPG images at client device 120. Graphics API interceptor 710 may intercept the call, and may extract metadata from the call. The metadata may relate to a logical window tree constructed by EPG application 150, as described above. FIG. 10 depicts an example of graphics API interceptor 710 intercepting a graphics call 1000 from EPG application 150, and extracting 1005 metadata from graphics call 1000.

Graphics API interceptor 710 may translate the graphics call into an image to be rendered (block 815). In the example of FIG. 10, after receipt of graphics call 1000, graphics API interceptor 710 is depicted translating 1010 the call into an image. Graphics API interceptor 710 may pass the image and the extracted metadata to window manager 720 (block 820). The example of FIG. 10 depicts an image 1015, generated by graphics API interceptor 710, and extracted metadata 1020 being passed to window manager 720. Window manager 720 may receive the image from graphics API interceptor 710 (block 825), and may also receive the metadata, that tracks the logical window tree and nodes built by EPG application 150, from graphics API interceptor 710 (block 830).

Figure 11:
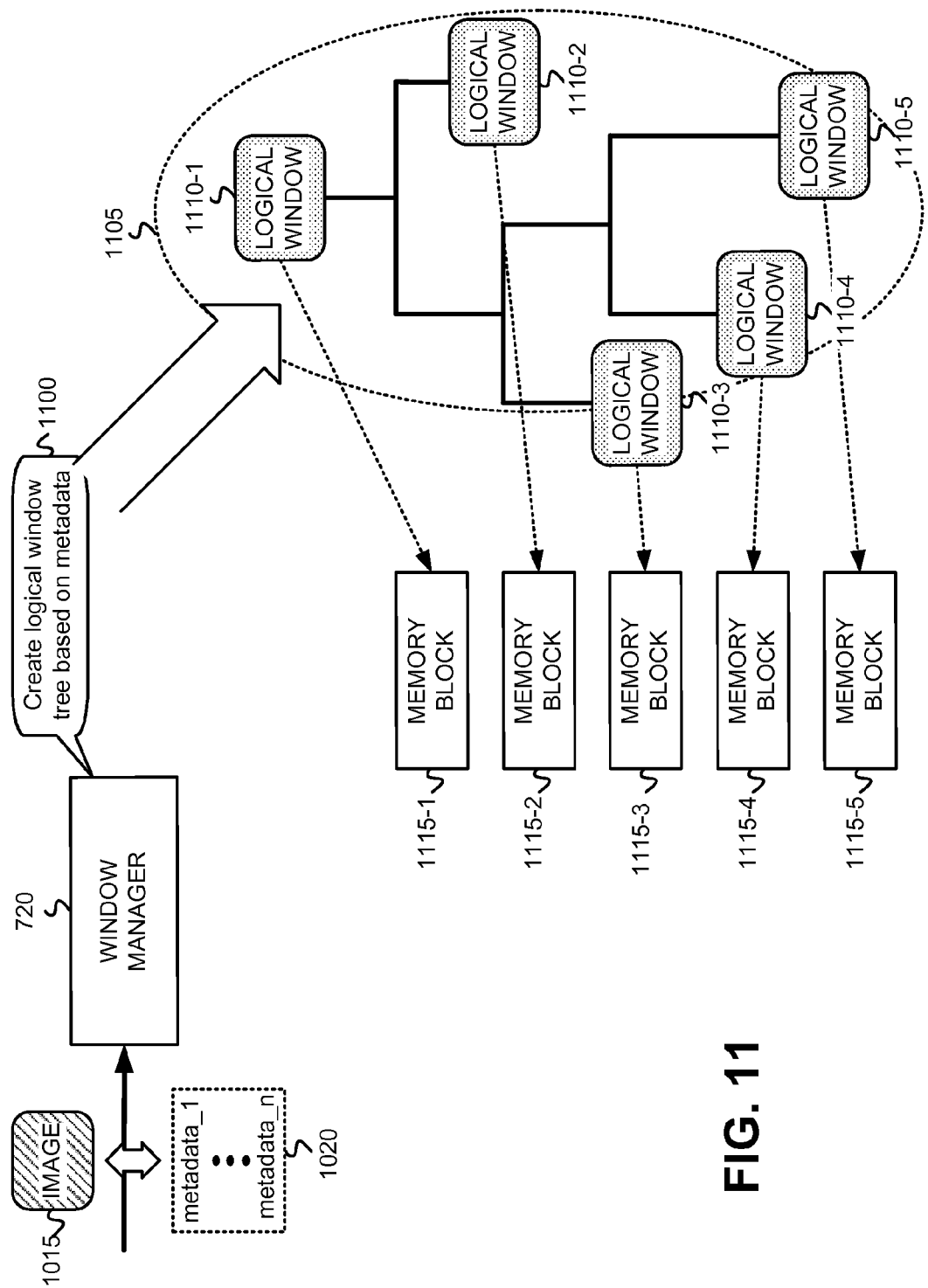

Window manager 720 may create, based on the metadata, a second logical window tree, where each node represents a display window associated with the image (block 835 in FIG. 8B). The example of FIG. 11 depicts window manager 720 creating 1100 a logical window tree 1105 based on metadata 1020. FIG. 11 further shows logical window tree 1105 as including multiple nodes having multiple logical windows 1110-1 through 1110-5. Each of logical windows 1110-1 through 1110-5 includes a pointer to a corresponding one of memory blocks 1115-1 through 1115-5, where image data associated with each respective logical window may be stored. Each one of logical windows 1110-1 through 1110-5 shown in FIG. 11 may represent a component of image 1015. A change in one component of image 1015 may, therefore, cause an overall change in the resulting image 1015 that includes a combination of the image data of the logical windows of logical window tree 1105.

Figure 12:
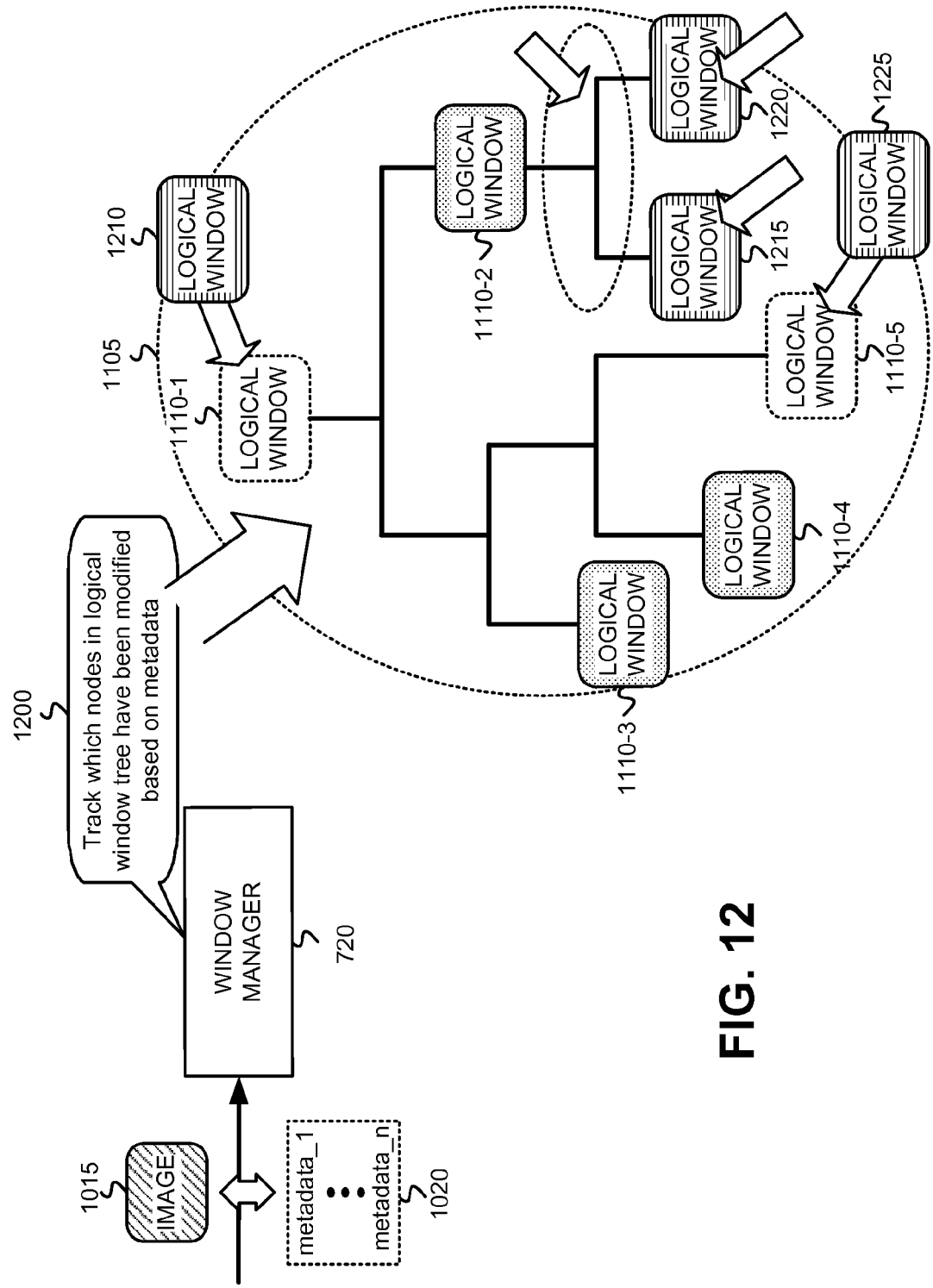

Window manager 720 may track, based on the metadata, which nodes in the logical window tree have been modified by graphics operations (block 840). Modifications to logical window tree 1105 may include replacing one or more of the logical windows with different logical windows and/or adding or removing "branches" of tree 1105. The example of FIG. 12 depicts window manager 720 tracking 1200 which nodes in logical window tree 1105 have been modified based on metadata 1020. As further shown in FIG. 12, logical window tree 1105 has been modified by the replacement of logical window 1110-1 with logical window 1210, the insertion of a new tree branch having new logical windows 1215 and 1220, and the replacement of logical window 1110-5 with logical window 1225. Based on the modifications to logical window tree 1105, the resulting image 1015 will, therefore, have changes.

Figure 13:
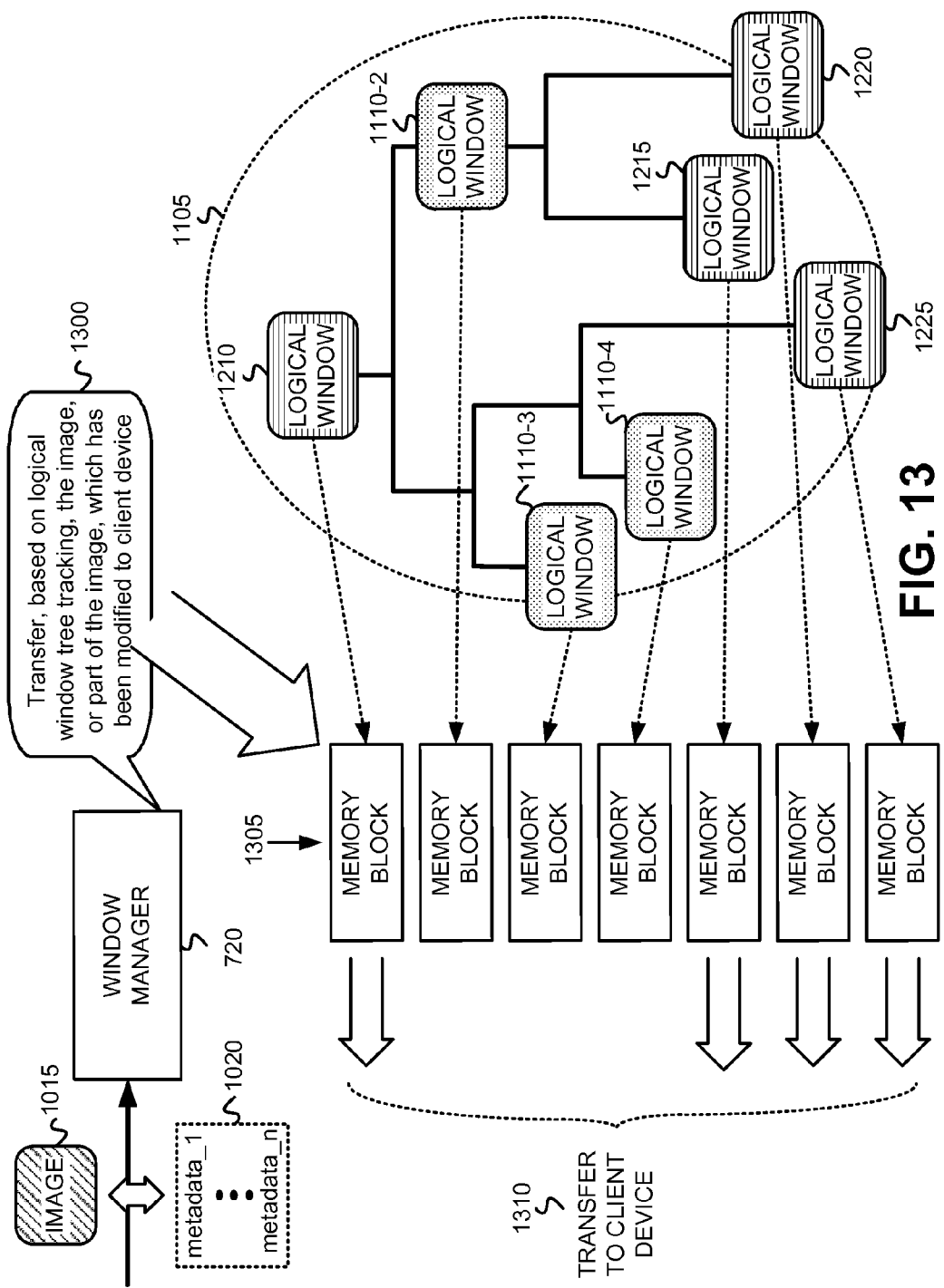

Window manager 720 may transfer, based on logical window tree tracking, the image, or part of an image, which has been modified to client device 120 (block 845). Window manager 720 may transfer only a single image, in a series of images, which has been modified, or may transfer a portion, or portions of an image that have been modified. In the case where the image is being displayed at client device 120 for the first time, window manager 720 may transfer the image in its entirety. Referring to the example of FIG. 13, window manager 720 is shown transferring 1300, based on the logical window tree tracking of block 840, the image or part(s) of the image, which has been modified to the client device. As further shown in FIG. 13, logical windows 1210, 1215, 1220 and 1225 represent logical windows that have been modified in logical window tree 1105. Therefore, window manager 720 causes the image data corresponding to each of logical windows 1210, 1215, 1220 and 1225, stored in respective memory blocks 1305, to be transferred 1310 to client device 120. Window manager 720, thus, transfers only those parts of image 1015 that have been modified, thereby, reducing the bandwidth usage between server 110 and client device 120. Since client device 120 already stores the remaining parts of image 1015 (from a previous image data transfer), client device 120 can combine all of the image parts represented by the logical windows of logical window tree 1015 to create the resultant image 1015 for display at client device 120. The exemplary process may return to block 810 with the interception of another call by graphics API interceptor from EPG application 150.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 8A and 8B, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device, comprising:
an electronic program guide (EPG) component that initiates a graphics call based on EPG data received from an external EPG server, wherein the graphics call causes a first one of multiple client devices to display one or more first EPG images; and
a manager component comprising:
a pre-loader that pre-renders and sends, in a background utilizing unused bandwidth, at least one second EPG image that is frequently re-used to the multiple client devices; and
a window manager that:
creates a logical window tree associated with the one or more first EPG images, wherein the logical window tree comprises multiple nodes and wherein each of the multiple nodes comprises a respective logical window that represents one component of the one or more first EPG images,
tracks changes in the logical window tree,
identifies, based on changes in the logical window tree, a modified EPG image of the one or more first EPG images or a modified portion of an EPG image of the one or more first EPG images, and
sends the modified EPG image, or the modified portion of the EPG image, from the network device to the first one of the multiple client devices without sending other non-modified EPG images of the one or more first EPG images or without sending a non-modified portion of the EPG image of the one or more first EPG images, to cause the first one of the multiple client devices to create a logical canvas of the EPG that comprises a composite image based on the pre-rendered at least second EPG image, the one or more first EPG images, and the modified EPG image or the modified portion of the EPG image.

2. The network device of claim 1, wherein the EPG comprises menus of program scheduling information that displays current and upcoming television programming.

3. The network device of claim 1, wherein the pre-loader further:
stores the pre-rendered at least one second EPG image, and
sends the stored, pre-rendered at least one second EPG image to a new client device of the multiple client devices when the new client device connects to the network device.

4. The network device of claim 1, wherein the unused bandwidth comprises one or more unused Quadrature Amplitude Modulated (QAM) channels.

5. The network device of claim 1, wherein the manager component further comprises:
a graphics interceptor that intercepts, and extracts metadata from, the graphics call, and generates the one or more first EPG images based on the graphics call.

6. The network device of claim 5, wherein the logical window tree further comprises multiple branches and wherein the window manager further:
creates the logical window tree based on the extracted metadata, and
tracks the changes in the logical window tree based on the extracted metadata, wherein tracking the changes comprises tracking an addition of at least one branch to, or a removal of one of the multiple branches from, the logical window tree.

7. The network device of claim 1, wherein the EPG component receives the EPG data associated with the EPG from the external EPG server over a first network and wherein the network device connects to the multiple client devices via a second network.

8. The network device of claim 1, wherein each node of the logical window tree comprises a different logical window that includes a pointer to a different block of memory that stores image data associated with the one or more first EPG images.

9. A non-transitory computer-readable medium containing instructions executable by at least one processor, the non-transitory computer-readable medium, comprising:
one or more instructions for causing a first set of images, associated with an electronic program guide (EPG), to be sent from a network device to a client device in a background utilizing unused bandwidth, wherein the first set of images comprise pre-rendered EPG images that are frequently re-used;
one or more instructions for receiving a graphics call, at the network device, for displaying a second set of images, associated with the EPG, at the client device, wherein the second set of images is different than the first set of images;
one or more instructions for extracting metadata from the graphics call;
one or more instructions for creating a first logical window tree, comprising multiple nodes, based on the extracted metadata;
one or more instructions for tracking changes to the first logical window tree, wherein each node of the multiple nodes of the first logical window tree comprises a different logical window that includes a pointer to a different block of memory that stores image data associated with the second set of images;
one or more instructions for determining that an image of the second set of images has been modified, or for determining that one or more portions of the image have been modified, based on the tracked changes to the first logical window tree; and
one or more instructions for causing the modified image, or the one or more portions of the image that have been modified, to be sent from the network device to the client device without sending other images of the second set of images or without sending remaining portions of the image that have not been modified, to cause the client device to create a logical canvas of the EPG that comprises a composite image of the pre-rendered EPG images, the other images of the second set of images or the remaining portions of the image that have not been modified, and the modified image or the one or more portions of the image.

10. The non-transitory computer-readable medium of claim 9, further comprising:
one or more instructions for receiving data associated with the EPG from a remote EPG server.

11. The non-transitory computer-readable medium of claim 9, wherein the one or more instructions for tracking changes to the first logical window tree further comprises:
one or more instructions for identifying at least one of modifications to logical windows of the first logical window tree or additions to the logical windows of the first logical window tree.

12. A network device, comprising:
an electronic program guide (EPG) component that receives EPG data associated with an EPG from an external EPG server over a first network; and
a manager component comprising:
a pre-loader that pre-renders and sends at least one first EPG image, associated with the EPG, that is frequently re-used to multiple client devices,
a graphics interceptor that generates one or more second EPG images based on a graphics call, wherein the graphics call causes a first one of the multiple client devices to display the one or more second EPG images, and
a window manager that:
tracks changes in the one or more second EPG images, and
sends a modified EPG image, corresponding to an image of the one or more second images, that includes the changes, or a modified portion of an EPG image, corresponding to an image of the one or more second images, that includes the changes, from the network device to the first one of the multiple client devices to cause the first one of the multiple client devices to create a logical canvas of the EPG that comprises a composite image that is based on the at least one first EPG image, and the modified EPG image or the modified portion of the EPG image,
wherein, when tracking changes in the one or more second EPG images, the window manager:
creates a logical window tree comprising multiple nodes and multiple branches, wherein each of the multiple nodes comprises a respective logical window that represents one component of the one or more second EPG images,
tracks changes in the logical window tree, wherein tracking the changes comprises tracking an addition of at least one branch to, or a removal of one of the multiple branches from, the logical window tree, and
identifies, based on changes in the logical window tree, the modified EPG image or the modified portion of the EPG image.

13. The network device of claim 12, wherein, when sending the modified EPG image or the modified portion of the EPG image, the window manager further:
refrains from sending other non-modified EPG images of the one or more second EPG images to the first one of the multiple client devices, or
refrains from sending a non-modified portion of the EPG image of the one or more second EPG images to the first one of the multiple client devices.

14. The network device of claim 12, wherein the EPG component further:
initiates the graphics call based on the EPG data received from the external EPG server, and
wherein, when generating the one or more second EPG images, the graphics interceptor further:
intercepts the graphics call from the EPG component, and
translates the graphics call into the one or more second EPG images.

15. The network device of claim 12, wherein, when generating the one or more second EPG images, the graphics interceptor further:
extracts metadata from the graphics call, and
passes the metadata to the window manager.

16. The network device of claim 15, wherein, when tracking changes in the one or more second EPG images, the window manager further:

receives the metadata from the graphics interceptor, and wherein creating the logical window tree is based on the metadata.

17. The network device of claim 12, wherein the respective logical window includes a pointer that points to a corresponding memory block that stores image data associated with the respective logical window.

18. The network device of claim 12, wherein the network device connects to the one or more client devices via a second network and wherein the EPG comprises menus of program scheduling information that displays current and upcoming television programming.

19. The network device of claim 12, wherein the pre-loader further:
sends, in a background utilizing unused bandwidth, the pre-rendered at least one first EPG image that is frequently re-used to the multiple client devices, and wherein the unused bandwidth comprises one or more unused Quadrature Amplitude Modulated (QAM) channels.

20. The network device of claim 12, wherein the pre-loader further:
stores the pre-rendered at least one first EPG image, and sends the stored, pre-rendered at least one first EPG image to a new client device of the multiple client devices when the new client device connects to the network device.

* * * * *